3,124,731
ELECTRONIC TIME PIECES
Richard Eysen, Bienne, and Adrien Nogarede, Geneva, Switzerland, assignors, by mesne assignments, to Fabrique des Montres Zenith SA, Le Locle, Switzerland
Filed Nov. 28, 1960, Ser. No. 71,967
Claims priority, application Switzerland Dec. 28, 1959
17 Claims. (Cl. 318—132)

This invention pertains to timepieces and more particularly to electronic watches. It is well known that an electronic watch can be constructed in which the oscillations of its balance are maintained as shown by the semi-diagrammatic view of FIG. 1 by disregarding a connection which will be referred to hereinafter and which concerns in fact the object of the present invention.

In FIGURE 1, the balance 1 carries a permanent magnet 2 and a diametrally opposed counter-weight 3. The N—S axis of the magnet 2 is directed parallelly to the pivoted balance staff, in order to suppress the influences of a uniform external magnetic field, and in particular those due to the earth's magnetic field.

In the idle position of the balance (mechanical and electrical position) the axis of the magnet 2 coincides with the common axis of the iron free core type coils 4 and 5 located below and above the magnet 2 respectively.

The coil 4, called control coil, supplies the base of a transistor 6, the collector of which feeds the coil 5, called the power coil.

Once the balance 1 has been set in motion, the current impulses resulting therefrom in the control coil 4 are amplified by the transistor 6 and retransmitted to the magnet through the power coil 5, a battery 7 supplying the feeding voltage. However, this arrangement presents the inconvenience of not being self-starting, the balance having to be set in motion after the induction and power amplification devices have been switched on.

An object of the present invention is to enable the balance to start of its own accord when the device has been switched on and in a general manner to prevent the balance from stopping because of an external influence.

This object is attained by causing, on the one hand, for the magnet 2 to come to its position of rest a short distance from the common axis of both coils 4 and 5, as shown in FIG. 2, in which the balance 1 is partly represented and the upper coil 5 removed, and on the other hand, by applying to the base of the transistor 6 a potential for causing the transmitter-collector current to be higher than the quiescent current of the transistor, hence applying to the magnet 2, of an impulsion sufficient, for instance, to make it move in the direction of the arrow 8, so as to start the oscillating motion.

Depending on the capacity of the battery used, it will be possible to maintain or interrupt this auxiliary starting potential applied to the transistor base.

The accompanying drawings show five embodiments of the invention, given by way of example, in which it is shown that the starting is mechanically possible when the balance serves to drive a watch movement and how to improve the operation free from temperature changes.

Figures 6, 7:
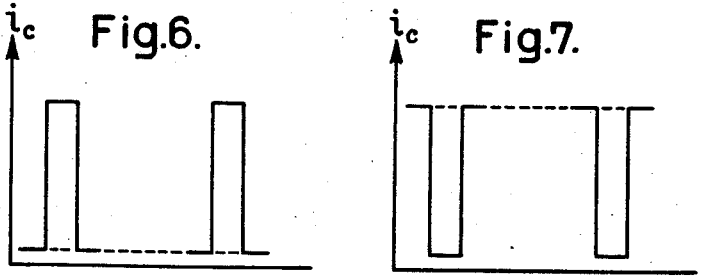

FIGS. 6 and 7 refer to waveforms of impulses in relation to temperature.

Figure 5:
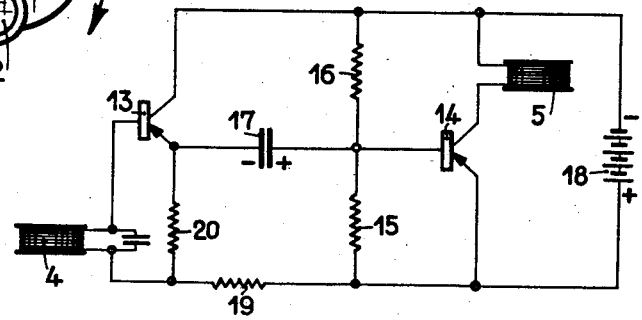
FIG. 5 shows a schematic diagram of the second embodiment of the invention.
Figure 8:
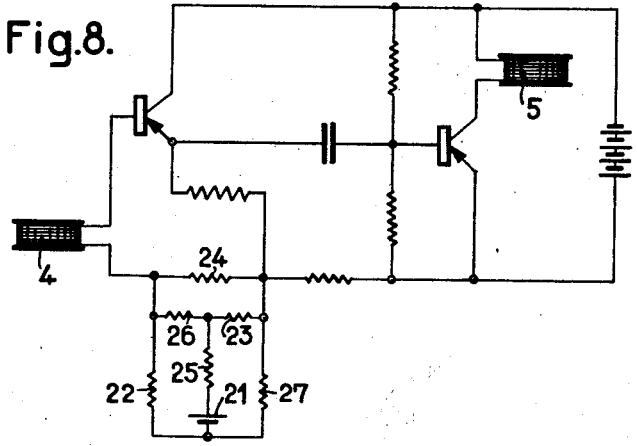

FIG. 8 is a schematic diagram similar to that of FIG. 5, but including a thermal compensation means.

Figure 9:
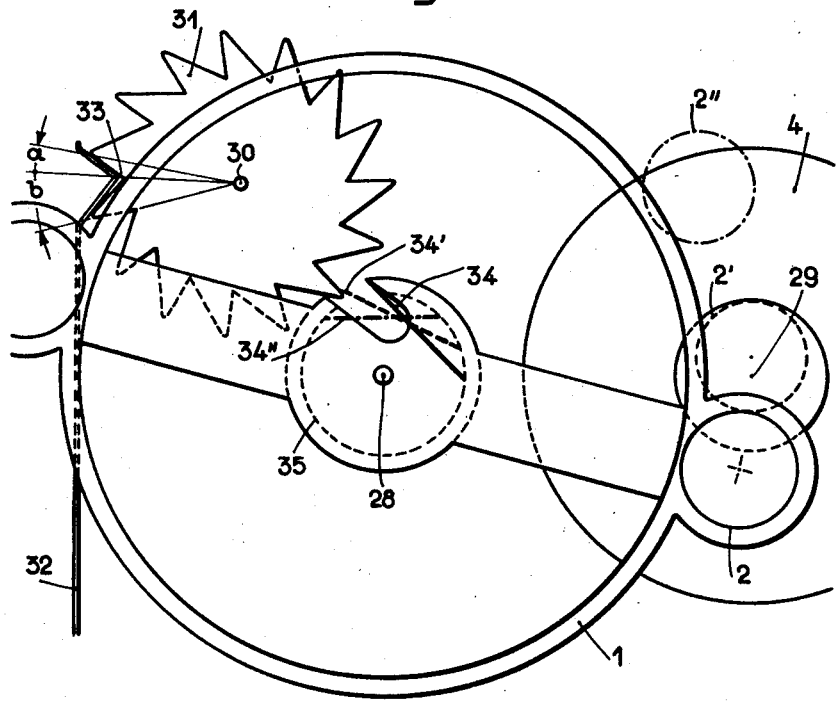

FIG. 9 refers to the practical starting conditions when the balance drives a watch movement.

Figure 10:
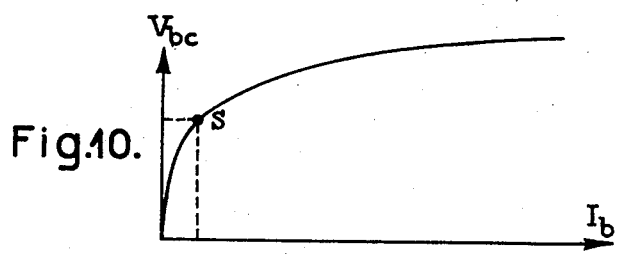
Figure 11:
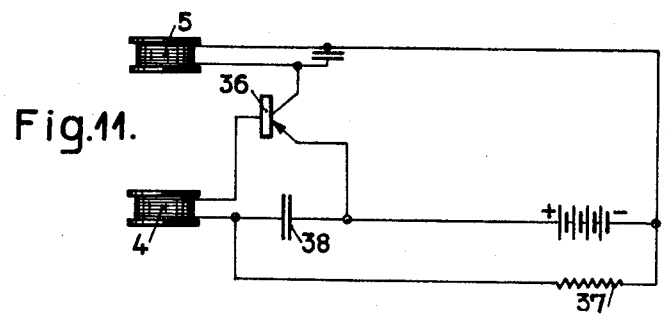
Figure 12:
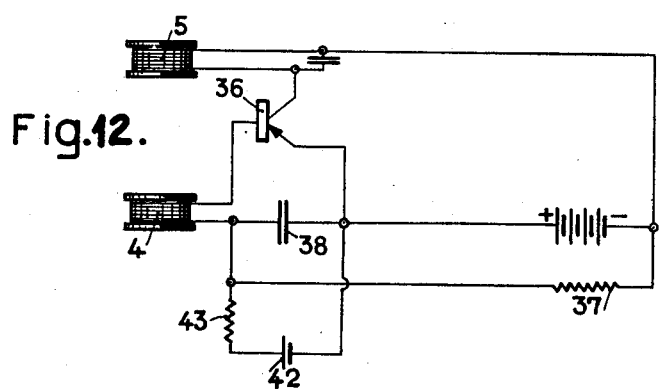

FIG. 10 is a diagram referring to the working of the following embodiments, i.e.: the third embodiment shown schematically in FIG. 11, and the fourth embodiment shown schematically in FIG. 12.

Figure 13:
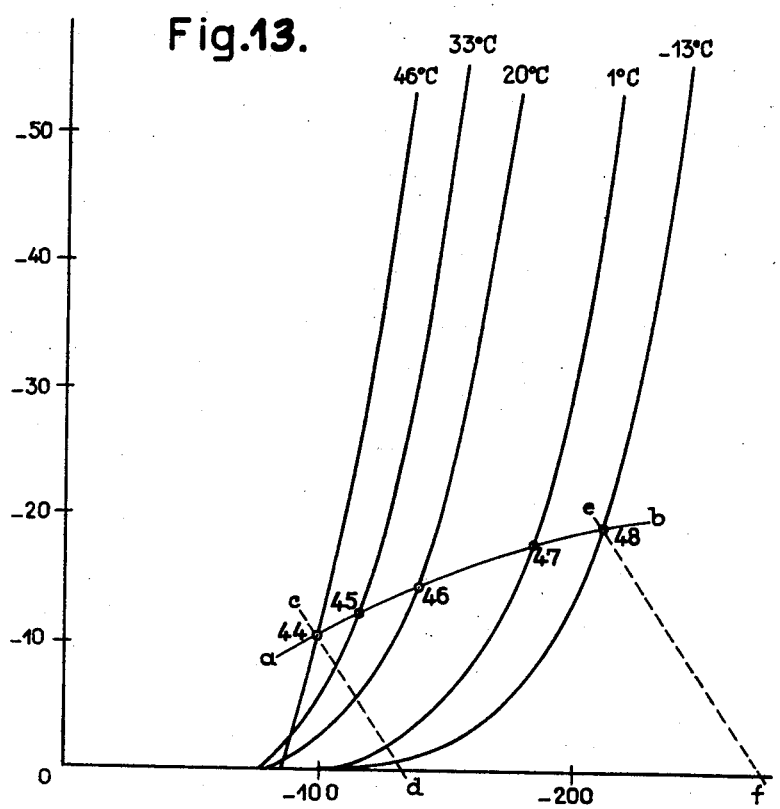

FIG. 13 shows a family of curves illustrating broadly the relation which exists between the base voltage (abscissae in millivolts) and the base current (ordinates in microamperes) for various temperatures indicated at the apex of the curves, for a transistor such as those utilized in various embodiments of the present invention.

Figure 1:
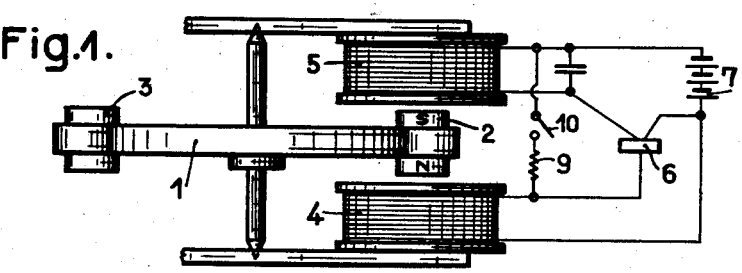
FIG. 1 shows an embodiment heretofore known in the art.
Figure 14:
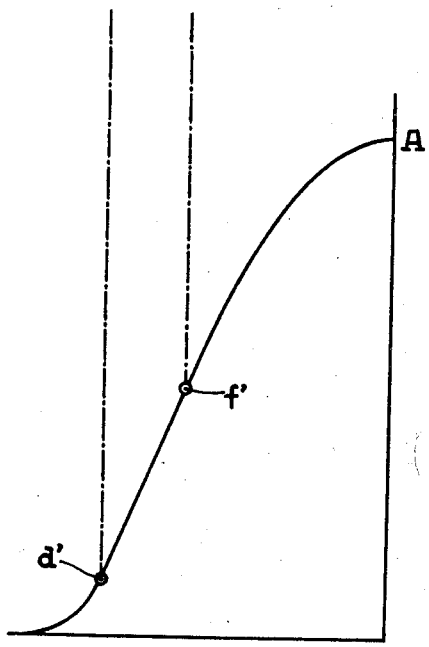

FIG. 14 shows the control voltage, for instance in the coil 4 of the example of FIG. 1.

Figure 15:
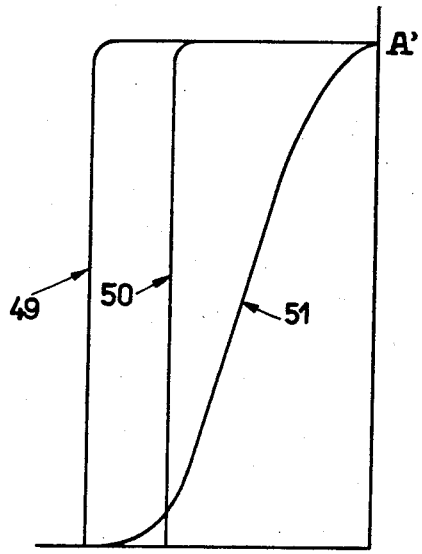

FIG. 15 shows two superimposed impulse curves.

Figure 16:
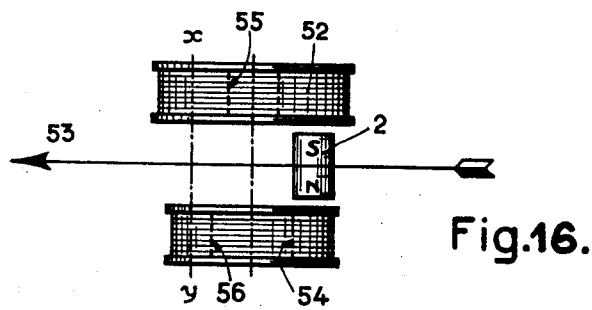

FIG. 16, finally, shows an improved construction of the coils based on the aforesaid curves, for rendering the operation of an electronic watch practically free from the variations of the ambient temperature.

Figure 2:
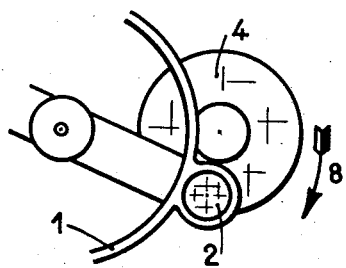
FIG. 2 is a corresponding partial plan view.

The first embodiment of the invention shown in FIG. 1, in correlation with FIG. 2, consists in allowing a bridge to be set between the negative pole of the battery 7 and the base of the transistor 6, which is in this case of the p-n-p type operating in class B. This bridge is the resistance 9 which can be connected into the circuit by means of a switch 10, which could be, for instance, a push-button type.

Figure 3:
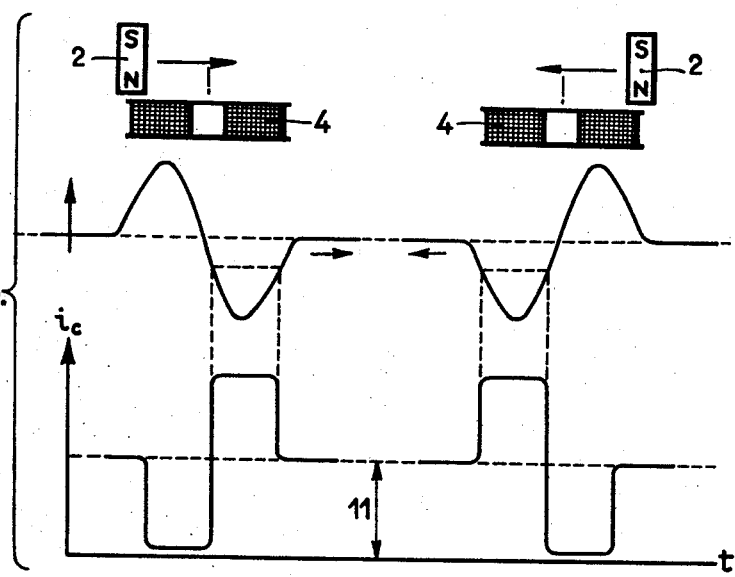
FIGS. 3 and 4 are waveforms referring to class A and class B operation of transistors.

Since the battery 7 is connected, it will be seen that upon closing the switch 10, the transistor will be in a condition to operate in class A. In class A operation the transmitter-collector current is high, as shown in the diagram of FIG. 3, where this current is measured by the ordinate 11 of the collector current time system of the lower curve. The upper curve corresponds to the primary sinusoidal impulses induced in the coil 4 in both oscillating directions of the magnet 2.

It is that current which, going through the power coil 5 will impart to the balance 1 initially shifted into the idle position of FIG. 2, a first impulse sufficient to cause magnet 2 to induce in the coil 4 a current which, greatly amplified by the transistor 6, will exert a new impulse on the balance 1, and so forth, until it has reached its normal oscillating rate.

The value of current 11 has been represented by an ordinate corresponding to class A operation of the transistorized amplifying device, but it is clear that this value may be increased or decreased within good design limits to permit self-starting.

It should be noted that FIGS. 1 and 2 show a balance completely free to oscillate. In reality, and particularly in a timepiece, this balance drives a gear train and must therefore at times overcome mechanical resistance. It is evident that if this resistance were present during the starting time the starting could not take place because, the starting impulse would be insufficient for this purpose.

Further, it will be noted that when placing the balance initially in the shifted position of FIG. 2, not only will the starting impulse be made possible but it will permit the balance to perform its first oscillations without load, at least until it attains a given amplitude beyond which it will then drive the mechanism it controls, since it will have acquired sufficient kinetic energy.

Figure 4:
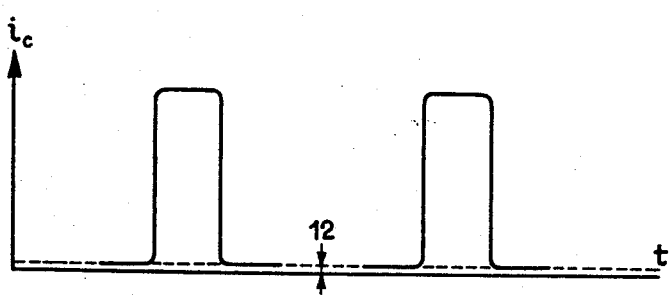

Once the starting is accomplished, and if there is not sufficient capacity in the battery or it is desired to improve the energetic output, it is only necessary to open the switch 10 for causing the transistor 6 to operate in class B, the waveform of the impulses taking then the form of FIG. 4, where the quiescent or idle current 12 is extremely weak.

Thus, an electric starting is achieved without the necessity of imparting to the balance an initial mechanical impulse, for instance, by imparting to the whole timepiece a swinging motion.

The schematic diagram of the second embodiment as shown in FIG. 5 provides for the automatic cancellation of the starting base-transmitter voltage as soon as the balance has reached an oscillation amplitude sufficient for its self-maintenance.

There is shown therein the control coil 4 and the power coil 5. The embodiment further includes two transistors 13 and 14, the collector of the second being connected to the power coil 5 and the base of the first to the control coil 4. The supply of the base of the transistor 14 is provided through a bridge made up of two resistances 15 and 16, dividing the voltage, so as to give a base-emitter voltage enabling transistor 14 to operate in class A. The capacitance 17 is on the other hand to be considered as an infinite resistance (in direct current) inserted between the emitter of transistor 13 and the base of transistor 14. For the reasons given hereinafter, this capacitance should be of high value.

When the battery 18 is connected to the circuit, the transistor 14, working in a class A, has a high collector current and the power coil 5 will impart a relatively strong initial impulse to the balance 1 shifted in the way already described.

On the return swing of balance 1, its magnet 2 will induce a given current in the control coil 4 which, amplified by the transistor 13, the collector of which influences the base of the transistor 14 through capacitance 17, will give rise to a new impulse by the power coil 5, and so forth. Self-starting is thus achieved.

At each impulsion, which on the other hand is damped by resistance 19, the capacitance 17 will receive an increment of charge. If capacitance 17 and the resistance 19 have appropriate values, in particular a sufficiently high time constant, capacitance 17 will retain its charge and apply a positive voltage to the base of transistor 14. This new polarization of the base will have the effect of modifying the characteristics of this transistor, which will henceforward operate in class B. Thus, and as long as the balance 1 oscillates, the system under consideration, with two amplifying stages will work in class B.

By judicious selection of the values of the various elements of the circuit already described, as well as appropriate transistors, it will be possible, within practical limits, to disregard special compensation for temperature variations.

It will be sufficient to introduce between the emitter of transistor 13 and the positive terminal of battery 18, a resistance 20, with the object of polarizing the emitter positively at high temperatures and when the transmitter-collector current increases, in order to impede premature saturation of this transistor, which would cause the cancelling of the auxiliary voltage applied to the base of the transistor 14.

Trials have shown, with regard to low temperatures, that the device starts at +6° C., but works until —10° C., once started.

The transistor 13 will be however saturated if the exceptional temperature of +50° C. is reached. FIG. 6 represents the impulse diagram at normal say about 20° C. temperature for class B, whereas FIG. 7 shows the impulse diagram for temperatures above 50° C. It will be seen that in the second case, the transistor is in a saturation state for direct current.

The working limits can of course be increased, for instance, so as to obtain self-starting from —10° C. up to more than 50° C., by adding to the circuit of FIG. 5 the following compensating elements, which are a measure already known and are shown in FIG. 8.

In the circuit of the control coil 4 there is provided a resistance network and the auxiliary battery 21. These resistances constitute bridges with the resistances 22 to 25 fixed, and the resistances 26 to 27 present a value varying inversely with temperature.

Reference was made above to a shifted position of the balance 1 for facilitating its starting when it drives a mechanism, such as for instance a time piece movement.

FIG. 9 will be used to explain in more detail this feature of the invention. It refers to a plan-view showing the working of the escapement through which the mechanical driving occurs.

At point 28, is the balance staff 1, at point 29, the common axis of the coils, of which the control coil 4 is visible and, at 30, the staff of a saw-tooth escape wheel 31, the movement of which is stopped, after each forward movement of a tooth, by the jumper spring 32.

The beak 33 of jumper spring 32 is shaped so as to divide the pitch of the escape wheel 31 into two unequal parts, viz: the smaller part corresponding to the angle $a$, during which the escape wheel 31 pushes the jumper back, and the larger part, corresponding to the angle $b$, during which the jumper spring 32 becomes a driver, in the sense that it causes the turning of the escape wheel.

The initial impulse is imparted to the escape wheel 31 by a driving elastic blade 34, mounted on a roller table, and strikes a successive tooth of the said wheel.

In the driving direction (opposite to that of the arrow 8) of FIG. 2, the blade 34 presses hard against the roller table, in reverse direction (return swing), it bends. A groove 35 milled in the roller plate allows the teeth of the escape wheel to pass freely.

According to FIG. 2, the idle or zero point i.e., the rest position of the balance-hairspring system is shifted in relation to the axis 29 of the coils, the magnet then being in position 2, the position which corresponds all the indications given in continuous lines of FIG. 9. However, it is in the zone of influence of the coils, i.e. that the magnetomotor power of the latter is capable of pushing the magnet 2 back in the direction of the arrow 8.

On its way back, and until the driving blade meets with a tooth of the escape wheel (position 34' of this blade and 2' corresponding to the magnet), the balance oscillates freely. It can thus acquire sufficient kinetic energy before the instant where the driving of the escape wheel will take place. The keying of the roller plate, bearing the blade 34 on shaft 28 must be effected accordingly, care being taken, however, that the initial shifting of the magnet 2 in relation to the shaft 29 is compatible with the most accurated superposition possible, of the driving resistance of the escape wheel with the magnetic driving impulse imparted to the balance during the half-vibration in question. As the driving operation takes place after the mechanical zero point, the isochronism of the oscillations will be obtained when the driving resistance which tends to diminish the period, will be offset by a practically equivalent impulse.

The escape-wheel 31 having been moved forward by one tooth, whilst the spring blade 34 has passed to 34" and the magnet 2 to 2", the blade will bend during a small oscillation angle allowing it to bear against the front of a new tooth, this angle must be smaller than the angle through which the balance has to travel in order to return to its position of equilibrium (position 2 of magnet). This makes it possible to prevent the end of the blade 34 from remaining hooked behind a tooth of the escape wheel when the current is switched off or the device stops after exhaustion of the battery.

After the bending of blade 34, the balance 1 must also be in a position to travel freely through the angle comprised between the positions 2 and 2' of the magnets. Moreover, the value of this angle must be such that the return power of the hairspring (not shown) is greater than the resistance due to the binding of the driving blade 34. In such a case, it will be assured that the inducing magnet will always stop at position 2, i.e. in the condition indispensable to self-starting, the blade 34 being no longer in contact with the tooth of the escape wheel 31.

The appropriate values of the angles comprised between the positions 2 and 2' of the magnet, as well as 2' and 2"

are practically obtained by adjusting the depth of the penetration and the engagement angle of the driving blade in relation to the flanks of the teeth of the escape wheel 31. By thus locating the resistance of the said blade 34 and the return impulse in the immediate neighbourhood of the mechanical zero or idle point, the isochronism of the oscillations will be practically insured.

Contrary to what has already been described, it is also possible to make use of one sole transistor as described in the following embodiments.

First consider the curve of the FIG. 10, in which the ordinates correspond to the base-emitter, voltage and the abscissae to the base current. It appears therefrom that there is a point S of this curve, where for a very small increase of the base-emitter voltage, a great increase of the base current is obtained, whereas beyond that point S, the voltage variations exert practically no influence on the base current, i.e. do not produce utilizable changes. The point S will henceforth be called the threshold, i.e., where the curve of base-emitter voltage/base current is being bent.

In the third embodiment shown in FIG. 11, the transistor 36 has its base connected with the control coil 4 to amplify impulses that are transmitted by the collector to the power coil 5.

The transistor 36 being of the p-n-p type, has its base connected to the negative pole of the battery via the control coil 4 and a resistance 37. Resistance 37 has such a value that it charges the capacitance 38, inserted between the coil 4 and the emitter, with a negative voltage near the threshold S, corresponding therefore to the polarization of the base.

In this state, an infinitely small impulse will be sufficient to cause a large current to flow via the collector into the power coil.

Now, as the ideal stationary state of the balance is practically unobtainable, already due to the current impulse of the transistor fed to the coils, in particular to low frequencies, practice has shown that this arrangement gives automatic self-starting.

The impulses are then transmitted by the coil 4 to the coil 5 after amplification by the transistor, as explained above.

When the oscillation amplitude becomes sufficient, the input resistance of the transistor decreases greatly in the course of each oscillation and the capacitance 38 is partly discharged, being unable to be recharged, due to the long time constant selected for that capacitance and the resistance 37, with respect to the oscillating period. After several oscillations, the capacitance 38 will even be completely discharged, so that the transistor base is no longer polarized, the energy consumption of this latter will be practically reduced to the idle current between the impulses.

The circuit according to the fourth embodiment shown in FIG. 12 is identical to that of FIG. 11, but includes an arrangement for compensating for the influences of temperature on the characteristics of the transistor 36.

There is added a voltage between the emitter and the base from the battery 42 which is controlled by a resistance 43 whose resistance decreases greatly with increasing temperature in such a way as to oppose the fixed negative voltage of the base. Thus, the increase of the idle current occurring when the temperature rises is avoided or lessened.

All the arrangements already described will normally present the best working conditions with only a saturated transistor only, for which reason the application of an auxiliary voltage has been suggested which is the function of the ambient temperature for maintaining constant the amplifying co-efficient in spite of the variations in which the transistor is temperature sensitive.

The family of curves of FIG. 13 represent the relation between the base voltage (abscissae in millivolts) and the base current (ordinates in microamperes) as a function of various temperatures, indicated at the curves apex, i.e. from the left to the right, 46° C., 33° C., 20° C., 1° C. and −13° C.

On these curves there are marked the saturation points 44, 45, 46, 47 and 48, which are the points of intersection of these curves and the line $a$—$b$.

If, experimentally, the control voltage $d$ is determined so as to cause saturation at the temperature of 46° C. (point 44) this will give a direction $c$—$d$ to which a straight parallel line can then be drawn through each one of the other points 45 to 48. At the intersection points of these straight lines with the line of abscissae the chart so obtained shows the control voltage corresponding to the point under consideration (at the given temperature).

Now, the induced voltage in the power coil has the behaviour of the curve of FIG. 14. First, it increases asymptotically when the magnet approaches and then rapidly becomes sinusoidal.

If the power voltage corresponding to point $d$ of the FIG. 13 is for instance at $d'$ in FIG. 15 it will be sufficient, according to what has already been said, to bring about the saturation of the transistor at point 44 of the curve $a$—$b$, i.e. at the temperature of 46° C.

At the temperature of −13° C., the voltage corresponding to point $f$ (straight line $e$—$f$ of FIG. 13) will be for instance at $f'$ of the curve of FIG. 14.

Thus, it is only from the control voltage $f'$ that one will be certain to obtain in any case the saturation of a transistor likely to be subject to temperatures which are capable of reaching a minimum of −13° C.

The FIG. 15 shows two superposed power impulse curves, i.e. curve 49 corresponding to the saturation at point $d'$ and curve 50, corresponding to the saturation at point $f'$.

Whereas the first of these curves can only be obtained at the temperature of 46° C., the second will be realized in all events until −13° C., provided that the characteristic of the drive coil has been adapted accordingly, i.e. it has been given the form of the curve 51.

This can be obtained, according to the variant of FIG. 16, by giving to the control coil an outer diameter larger than the outer diameter of the drive coil.

Element 52 is a coreless control coil, without iron core, in which the permanent magnet 2 induces a voltage on its passage in direction of the arrow 53.

Element 54 is a coreless drive coil disposed coaxially with element 52.

It will be seen that the outer diameter of element 54 is less than the outer diameter of element 52, so that the magnet 2 will penetrate into the field of element 32 after having already penetrated in that of the control winding 54 (the proportions are in this case magnified).

With reference to the FIGS. 14 and 15, this means that the permanent magnet 2 induces in the coil 52 a voltage increasing from zero to point $f$, prior to being submitted to the power impulse of the winding 54, which attracts it only from that moment and exerts consequently on it only the impulse represented by the curve 50 corresponding for the temperature of −13° C. to a state of saturation of the transistor.

On the other hand, it is shown that the inner diameter 55 of the control coil 52 is smaller than the inner diameter 56 of the power coil 54, the difference between these two diameters being equal to that of the outer diameters, so as to provide a symmetry of the wound sections, for instance, in relation to an axis $x$—$y$. This is necessary in order that the apex A of the sinusoid of FIG. 15 representing the control voltage falls on the same axis as apex A' of the sinusoid of FIG. 16 conceiving the power impulse.

It is to be noted that the area between the curves 49 and 50 represents the energy lost when operating at 46° C. This extreme being rarely attained, the loss is in reality proportionately less important in relation to the normal temperatures of operation.

The apparatus of the invention guarantees not only self-starting, automatic restarting in the case of a possible stop, but also the generation of impulses of constant value by very simple means, without the use of any auxiliary voltage or special arrangements for adapting it to the surrounding temperature.

What we claim is:

1. In an electronic watch, a balance pivotably connected for oscillating about a given axis, a permanent magnet disposed on said balance and having a magnetic axis parallel to said given axis, a drive coil and a control coil coaxially displaced from each other and so disposed that said permanent magnet passes between said coils with the magnetic axis being parallel to the common axis of said coils, a transistor amplifying means including at least a base, an emitter and a collector, a source of voltage having a first terminal connected to said emitter and a second terminal, means for connecting said drive coil between said second terminal and said collector, means for connecting said control coil between said emitter and said base, whereby magnetic fields are generated by said coils, means associated with said balance for causing said balance to have a rest state wherein said magnetic axis is displaced from the common axis of said coils and said permanent magnet is under the influence of the magnetic fields generated by said coils, and means for applying a voltage to the base of said transistor amplifying means for temporarily increasing the emitter-collector current passing through said drive coil for starting said balance oscillating.

2. The apparatus of claim 1, wherein the polarity of magnetization of said permanent magnet with respect to the magnetic field generated by said drive coil is such as to cause an increase in the distance between said magnetic axis and said common axis when the emitter-collector current is temporarily increased.

3. The apparatus of claim 1 including means driven by said balance, said driven means only reacting to said balance when said balance has traveled a predetermined distance from its position in said rest state.

4. The apparatus of claim 3, wherein said driven means starts reacting when said balance has traveled a different distance from each side of said rest position so that the free movement of said balance is greater during repulsion of said permanent magnet than during attraction of said permanent magnet by said drive coil.

5. The apparatus of claim 1, wherein said voltage applying means includes circuit means for coupling said second terminal to said base to increase the potential of said base for increasing the emitter-collector current of said transistor until said balance freely oscillates.

6. The apparatus of claim 5, wherein said circuit means includes a switch which is closed to start said balance oscillating and then opened after said balance is fully oscillating.

7. The apparatus of claim 1 including a first capacitor for coupling said control coil to said emitter and a first resistor for coupling the junction of said control coil and said capacitor to the second terminal of said source of potential, the value of said capacitor and said resistor being such that when said balance is in the rest state the bias voltage between said base and said emitter is substantially equal to threshold voltage and when said balance oscillates said bias voltage decreases.

8. The apparatus of claim 7 further including a temperature sensitive resistor and second source of potential, in series, connected in parallel with said first capacitor.

9. The apparatus of claim 1, wherein the outer diameter of said control coil is greater than the outer diameter of said drive coil so that said permanent magnet is under the influence of said control coil before said drive coil when said balance approaches said coils and under the influence of said control coil after said drive coil when said balance leaves said coils.

10. The apparatus of claim 9, wherein the inner diameters of said coils differ from each other by the same amount as the other diameters differ from each other.

11. In an electronic timepiece, a balance means for oscillating about a given axis, said balance means including a permanent magnet, a control coil operatively disposed with respect to said permanent magnet whereby said permanent magnet induces magnetic impulses in said control coil while said balance oscillates, a drive coil operatively disposed with respect to said permanent magnet and adapted to receive impulses of current whereby said drive coil induces magnetic impulses on said permanent magnet, first and second transistors each including a base, an emitter and a collector, means for connecting the base of said first transistor to one end of said control coil, means for connecting one end of said drive coil to the collector of said second transistor, a first source of voltage including first and second terminals, means for connecting said first terminal to the collector of said first transistor and the other end of said drive coil, means for connecting said second terminal to the emitters of said first and second transistors and to the other end of said control coil, first and second resistors serially connecting said first and second terminals, means for connecting the junction of said first and second resistors to the base of said second transistor and a first capacitor for coupling the emitter of said first transistor to the base of said second transistor.

12. The apparatus of claim 11, wherein the values of said first and second resistors are chosen to cause said second transistor to operate in class A when said balance starts oscillating and thereafter to operate in class B.

13. The apparatus of claim 11, further including a third resistor for connecting the emitter of said first transistor to said second terminal.

14. The apparatus of claim 13, further including a fourth resistor connected between said third resistor and said second terminal for preventing high-temperature saturation of said first transistor.

15. The apparatus of claim 13, further including a temperature compensation resistance and voltage network connected between the end of said third resistor remote from the emitter of said first transistor and said other end of said control coil.

16. The apparatus of claim 15, wherein said temperature compensation resistance and voltage network comprises a fourth resistance connected between the other end of said control coil and the end of said third resistor remote from the emitter of said first transistor, fifth and sixth serially connected resistors connected in parallel with said fourth resistor, a second source of potential including first and second terminals, a seventh resistor for connecting the first terminal of said second source to the junction of said fifth and sixth resistors, an eighth resistor for connecting the second terminal of said second source to the junction of said fourth and fifth resistors, and a ninth resistor for connecting the second terminal of said second source to the junction of said fourth and sixth resistors.

17. The apparatus of claim 16, wherein the resistance of said fifth and ninth resistors varies inversely with temperature.

References Cited in the file of this patent

UNITED STATES PATENTS

| | | |
|---|---|---|
| 2,814,769 | Williams | Nov. 26, 1957 |
| 3,002,139 | Byrnes | Sept. 26, 1961 |

FOREIGN PATENTS

| | | |
|---|---|---|
| 68,837 | France | Feb. 3, 1958 |
| | (Addition to No. 1,092,411) | |